(12) United States Patent
Baumgarten

(10) Patent No.: US 8,985,695 B2
(45) Date of Patent: Mar. 24, 2015

(54) BACKREST MADE OF PLASTIC COMPRISING FUNCTIONAL ELEMENTS MADE OF OR COATED WITH PLASTIC

(75) Inventor: Jens Baumgarten, Braunschweig (DE)

(73) Assignee: Sitech Sitztechnik GmbH, Wolfsburg (DE)

( * ) Notice: Subject to any disclaimer, the term of this patent is extended or adjusted under 35 U.S.C. 154(b) by 0 days.

(21) Appl. No.: 13/567,401

(22) Filed: Aug. 6, 2012

(65) Prior Publication Data

US 2012/0326483 A1 Dec. 27, 2012

Related U.S. Application Data

(63) Continuation of application No. PCT/EP2011/000377, filed on Jan. 28, 2011.

(30) Foreign Application Priority Data

Feb. 6, 2010 (DE) .......................... 10 2010 007 052

(51) Int. Cl.
*B60N 2/42* (2006.01)
*B60N 2/68* (2006.01)
*B60N 2/66* (2006.01)

(52) U.S. Cl.
CPC *B60N 2/686* (2013.01); *B60N 2/66* (2013.01); *B60N 2/682* (2013.01)
USPC ............ 297/452.18; 297/216.13; 297/216.14; 297/284.4; 297/452.52; 297/452.53; 297/452.54

(58) Field of Classification Search
USPC ............... 297/284.4, 214.14, 452.52, 452.53, 297/452.63, 452.54, 216.14, 216.13, 452.18
See application file for complete search history.

(56) References Cited

U.S. PATENT DOCUMENTS

| | | | | |
|---|---|---|---|---|
| 2,803,293 A | * | 8/1957 | Rowland | 267/111 |
| 3,709,559 A | | 1/1973 | Rowland | |
| 3,843,477 A | * | 10/1974 | Rowland | 267/111 |
| 4,075,722 A | | 2/1978 | Rinard | |
| 4,368,917 A | * | 1/1983 | Urai | 297/452.54 |
| 4,415,147 A | * | 11/1983 | Biscoe et al. | 267/111 |
| 4,585,273 A | * | 4/1986 | Higgs et al. | 297/452.18 |
| 4,609,225 A | * | 9/1986 | Loucks | 297/16.1 |
| 5,067,772 A | | 11/1991 | Koa | |
| 5,253,924 A | | 10/1993 | Glance | |
| 6,644,740 B2 | * | 11/2003 | Holst et al. | 297/284.4 |
| 7,163,261 B2 | * | 1/2007 | Kawashima | 297/216.14 |
| 7,360,836 B2 | * | 4/2008 | Schwarzbich et al. | 297/284.4 |
| 7,399,036 B2 | | 7/2008 | Kowal et al. | |
| 7,585,027 B2 | * | 9/2009 | Blendea | 297/284.4 |
| 7,614,695 B2 | * | 11/2009 | Satou et al. | 297/284.4 |
| 2009/0212616 A1 | * | 8/2009 | McMillen et al. | 297/284.4 |
| 2010/0127551 A1 | * | 5/2010 | Heidmann et al. | 297/452.48 |

FOREIGN PATENT DOCUMENTS

| | | |
|---|---|---|
| DE | 2 223 361 | 5/1973 |
| DE | 29 52 499 | 7/1980 |

(Continued)

*Primary Examiner* — Rodney B White
(74) *Attorney, Agent, or Firm* — Muncy, Geissler, Olds & Lowe, P.C.

(57) ABSTRACT

A backrest is provided, whereby a frame-shaped base structure of which is made of a dimensionally stable plastic, The base structure being formed from beams. The frame-shaped base structure includes at least one functional element between the beams, and the at least one functional element is made only of a plastic and/or as a plastic-coated insert. Injection molding is proposed as a production method.

22 Claims, 2 Drawing Sheets

(56) References Cited

FOREIGN PATENT DOCUMENTS

| DE | 94 06 437 U1 | 7/1994 |
|---|---|---|
| DE | 199 61 070 C1 | 4/2001 |
| DE | 102 43 617 A1 | 4/2004 |
| DE | 10 2007 034 187 A1 | 1/2009 |
| GB | 1 333 476 | 10/1973 |
| WO | WO 00/47441 | 8/2000 |
| WO | WO 03/092440 A1 | 11/2003 |

* cited by examiner

BACKREST MADE OF PLASTIC COMPRISING FUNCTIONAL ELEMENTS MADE OF OR COATED WITH PLASTIC

This nonprovisional application is a continuation of International Application No. PCT/EP2011/000377, which was filed on Jan. 28, 2011, and which claims priority to German Patent Application No. DE 10 2010 007 052.1, which was filed in Germany on Feb. 6, 2010, and which are both herein incorporated by reference.

BACKGROUND OF THE INVENTION

1. Field of the Invention

The invention relates to a vehicle seat with an inherently stable backrest formed of plastic.

2. Description of the Background Art

Seat structures in vehicles are required to meet specific safety standards. These safety standards are higher for front seats in motor vehicles than for their back seats, because the front seats must absorb in addition the impact of the body and head of the back seat passengers. Therefore, most front seat backs are metal constructions, although other materials, particularly plastics or plastic composites with a high modulus of elasticity (high rigidity), can also be used. Seats made of metal constructions are relatively heavy and expensive. Alternatives can be backrests or seat components that are made at least partially of plastic or whose plastic is designed to be suitably stable or is at least partially reinforced.

DE 94 06 437 U1 discloses a vehicle seat with a backrest and a lower seat component, whose backrest is formed as an integrally formed hollow body, whereby the backrest is made of a plastic, particularly a thermoplastic resin. A reinforcing member made of a material with a high modulus of elasticity is incorporated into the plastic body of the backrest.

DE 22 23 361 discloses a frame for a vehicle seat, which is characterized by a reinforcing part embedded in a plastic body and made of wire, tubular metal, or pressed metal.

Methods such as compression molding, extrusion, and injection molding are known for producing molded plastic parts.

Injection molding, or the injection molding process, is a shaping method which is used very often in plastics processing. Directly usable molded parts can be produced extremely economically in large numbers by the injection molding process. Described in simplified form, the method works as follows: In an injection molding machine which has a heatable container with a discharging device, the particular thermoplastic plastic is melted with application of heat, and injected into a metal form, which is generally called a die. The cavity of the die determines the outer form and the surface structure of the part to be manufactured.

SUMMARY OF THE INVENTION

It is therefore an object of invention to provide a seat structure, particularly a backrest for a front seat, in which instead of the metal structure used thus far a high proportion of the structure is formed of a plastic. In this regard, the manufacture of such a product is simple, rapid, and cost-effective.

In an embodiment of the invention, a plastic frame-shaped base structure of a backrest has between beams of the backrest at least one functional element that is formed either from plastic and/or as a plastic-coated insert.

In an embodiment of the invention, it is provided that an insert is disposed in the frame-shaped base structure as a reinforcing stiffening element made of a metal, particularly a steel, or a light metal, particularly aluminum or magnesium, or alloys thereof. The stiffening element is used advantageously for the structural reinforcement of the frame-shaped base structure, which as described above is especially important in the case of front seats.

The reinforcing stiffening element is advantageous because the functional elements disposed between the beams of the backrest also transmit forces to the beams in case of a crash and with a normal load. These forces can be absorbed better by a frame-reinforcing stiffening element disposed in the frame.

A fiber-reinforced plastic is used in an advantageous manner to achieve a sufficient inherent rigidity of the frame-like base structure of the backrest and of the functional elements as well.

The advantage of the use of a fiber-reinforced plastic is its properties. Fiber-reinforced plastic has a high weight-based strength and rigidity, as well as a high vibration damping capacity and a high fatigue limit. Moreover, other properties are a low thermal expansion and a very good UV resistance. In addition, fiber-reinforced plastic has a very good formability and thus can be made into virtually any shape, whereby, in addition, simultaneously a color preselection for the components to be manufactured is possible with the use of colored fibers. Fiber-reinforced plastic can be used very well in the aforementioned and briefly described injection molding process.

The invention expounds by way of example functional elements made of plastic or plastic-coated functional elements equipped partially or totally with inserts, which will be described below, divided into first and second embodiment variants.

In an embodiment, a resilient contact surface is formed in the back area of a seat user between the beams of the frame of the backrest, whereas the second embodiment variant is a lumbar support, for example, like a lumbar plate, disposed between the beams of the frame of the backrest in the lumbar region of a seat user.

In an embodiment, a first functional element can be disposed between the beams as a plastic bar, which can be used as a resilient element in the area formed between the beams of the base structure.

In a further embodiment, a second or third functional element, disposed between the beams of the base structure, can be disposed as a coated partial insert or coated complete insert. A wire can be provided for the inserts, so that a plastic-coated bar with a wire insert also serves as a resilient element in the area formed between the beams of the base structure.

The wire mat, made of metal wires and formed in the seat structure of the backrest as a resilient contact surface, can be replaced by the plastic bar without an insert or by a plastic-coated bar provided with an insert.

In an embodiment, a fourth functional element is provided between the beams as a plastic part in the form of an angular or round plastic plate or in another predeterminable form, which serves as a lumbar support in the area formed between the beams of the base structure.

A fifth or sixth functional element, disposed between the beams of the base structure, can be disposed as a coated partial insert or coated complete insert. The insert can be made in the form of a plate, which as a plastic-coated plate serves as a movable lumbar support in the area formed between the beams of the base structure. The plate designed, for example, of a metal can be made very thin and has a material thickness that is less than the material thickness used for lumbar support plates according to the prior art. The desired weight advantage for the vehicle seat and a vehicle overall arises as a result.

The metallic lumbar plate known, which is formed in the seat structure of the backrest as a supportive contact surface, can be replaced by a plastic plate, without inserts, or by a plastic-coated plate with partially or completely disposed plate-like inserts.

The inserts for the lumbar plate must not be plate-like inserts. Optionally, wires can also be disposed in the form of a mat and be coated with plastic, so that a lumbar plate is formed which is made of plastic-coated wires, as a result of which stiffening of the functional elements analogous to the plate-like inserts is achieved.

It is provided that an insert used as a stiffening element, disposed in the frame of the backrest and/or the wire-like or plate-like insert between the beams of the frame of the backrest, is made of metal and/or a glass/carbon fiber.

In an embodiment, the insert disposed between the beams of the frame, as wire-like or plate-like insert can be connected to the insert disposed in the frame-shaped base structure, which serves as the frame-reinforcing stiffening element. This will be set forth in greater detail in the description section by the exemplary embodiments.

The production of such a backrest occurs preferably by means of injection molding in one work step.

It is provided to produce the beams, forming the frame-shaped base structure of the backrest, from a dimensionally stable plastic by means of an injection molding die, whereby simultaneously with the injection of the beams either functional elements to be disposed between the beams are injection molded completely (without inserts) of plastic and/or by the previously disposed inserts stiffening elements disposed in the beams and/or inserts disposed between the beams, as functional elements, are injection molded of plastic or oversprayed with the plastic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
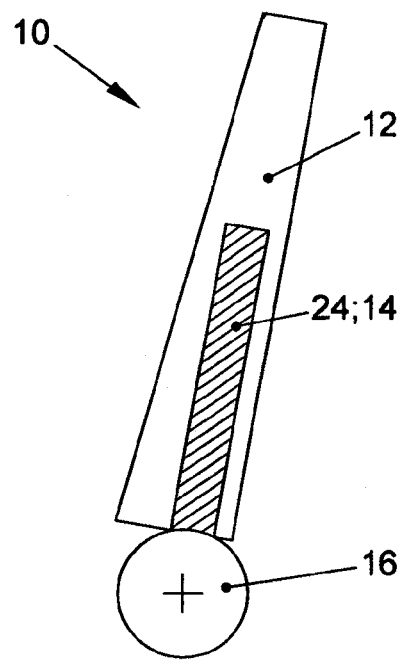
FIG. 1 shows a side view of a backrest, made of plastic, with a stiffening element formed as an insert in the base structure of the backrest.

FIG. 1 shows a side view of backrest 10, made of plastic, with a stiffening element 14, formed as insert 24 in the frame-like base structure 12 and made beforehand from a metal or a light metal. Stiffening element 14 can be disposed so that it is visible on the side, as shown, or is embedded not visibly in the plastic base structure 12 of backrest 10, as is shown in FIG. 2 in a schematic front view.

Stiffening element 14 is connected to a backrest bearing or a schematically shown backrest tilt adjuster 16, so that forces arising from the use of the vehicle seat and in a crash can be absorbed by the stiffened base structure 12, 14 of backrest 10 and the backrest bearing or backrest tilt adjuster 16. If the plastic is sufficiently stiff to be able to absorb the necessary forces, the arrangement of reinforcing stiffening element 14 is not necessary. The forces are then introduced from plastic backrest 10 directly to the usually metallic backrest bearing or backrest tilt adjuster 16.

Figure 2:
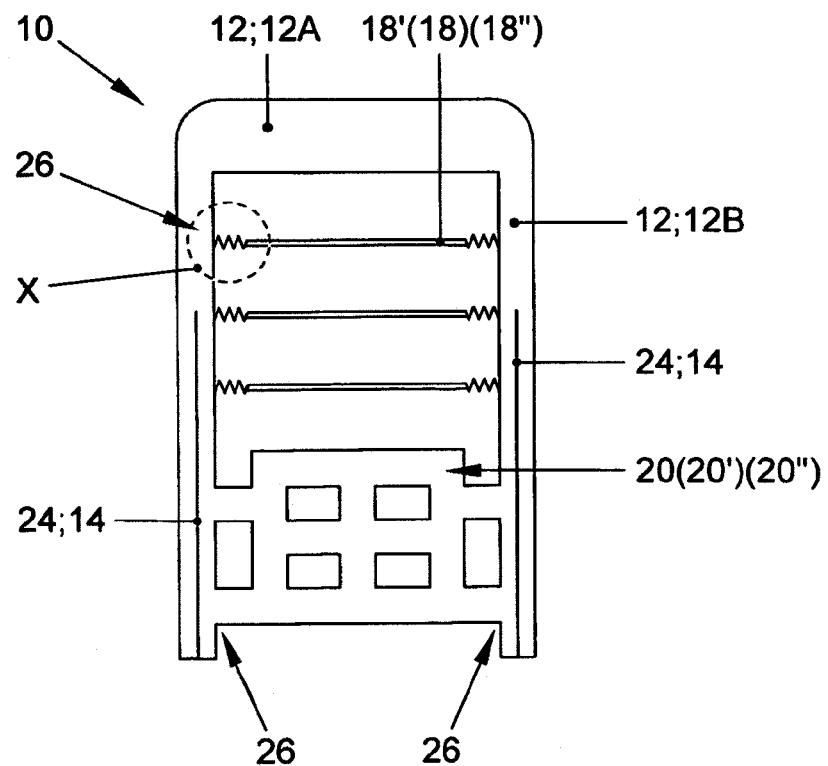
FIG. 2 shows the backrest in a front view with functional elements disposed between the beams of the frame-shaped base structure of the backrest.

FIG. 2 shows backrest 10 schematically in the front view. A transverse cross member 12A in the exemplary embodiment merges integrally into beams 12B, whereby functional elements 18' and 20 are disposed between the frame-shaped base structure 12, formed by beams 12B, of backrest 10. The reference characters 18, 18" and 20', 20" shown in parentheses in FIG. 2 denote various embodiment variants of the functional elements, which are disposed at this position but not shown but which, although not shown, will also be described below.

In conventional backrests in vehicle seats, wire bars or wire mats are formed between the beams in order to create suspension properties, comfortable for the user, of an upholstered backrest in the backrest contact area.

In addition, a lumbar support, which is mostly made in the shape of a plate, is attached between the beams of the backrest in the lumbar area of the seat user. This plate is reversibly displaceable toward the seat user by means of a lumbar adjusting unit and disposed within the backrest movable upward and downward or to both sides of the backrest.

These wire mats or the lumbar supports are functional elements, which, for example, stand for other functional elements, which according to an embodiment of the invention are to be formed as plastic components or as plastic-coated components.

Two exemplary embodiment variants are presented below, each in three embodiments, which are defined below with the used reference characters.

The first embodiment variant is used to replace the known wire mat in the back area of a seat user.

First embodiment of the first embodiment variant:
Plastic bar 18 between beams 12B of backrest 10 (without inserts).

Second embodiment of the first embodiment variant:
Plastic bar 18' between beams 12B of backrest 10 with a partial insert 22'.

Third embodiment of the first embodiment variant:
Plastic bar 18" between beams 12B of backrest 10 with a complete insert 22".

The second embodiment variant is used to replace the known lumbar support in the lumbar area of a seat user.

First embodiment of the second embodiment variant:

Plastic plate 20 between beams 12B of backrest 10 (without inserts).

Second embodiment of the second embodiment variant:

Plastic plate 20' between beams 12B of backrest 10 with a partial insert 22'.

Third embodiment of the second embodiment variant:

Plastic plate 20" between beams 12B of backrest 10 with a complete insert 22".

In the first embodiment of the first embodiment variant, it is provided to replace the wire mat by at least one plastic bar 18 disposed between beams 12B of backrest 10.

The term plastic bar 18 does not mean that it refers only to a straight, bar-like plastic element between beams 12B of the backrest. Plastic bar 18 can be formed in the shape of a parabola or meander-shaped between the beams or with other conceivable contours. These explanations also apply to the other embodiments of both embodiment variants.

The employed plastic is permanently elastic and has very good recovery behavior, so that plastic bar 18 or a plurality of plastic bars 18 replaces a metallic wire mat according to the state of the art and forms a type of plastic resilient element disposed between beams 12B of backrest 10 or a type of resilient mat made of plastic. This first embodiment of the first embodiment variant is not shown in FIG. 2.

Figure 3A:
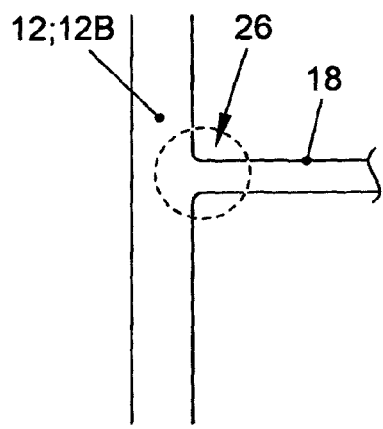
FIG. 3A shows a plastic bar, which is disposed as an elastically resilient element between the beams of the frame-shaped base structure.

However, FIG. 3A makes clear the arrangement and design of a formed plastic bar 18, without inserts, in a transition region 26 to a beam 12B.

According to the first embodiment, a second embodiment variant provides for replacing a plate-like lumbar support by at least one plastic plate 20 disposed between beams 12B of backrest 10. This first embodiment of the second embodiment variant is shown in FIG. 2. The plastic employed here is also permanently elastic and has very good recovery behavior, so that plastic plate 20 replaces the metallic plate of a lumbar support according to the state of the art and forms a type of plastic resilient plate disposed between beams 12B of backrest 10.

As FIG. 2 shows, plastic plate 20 has, for example, rectangular openings, as a result of which its flexibility is increased and the weight is reduced further. Also, lateral bars are provided to connect to beams 12 of frame 12 of backrest 10. These lateral bars provided in transition region 26 also represent plastic bars 18 according to FIG. 3A, as they are provided in the upper area of backrest 10 for the resilient back plastic bar, whereby the plastic bars for the plastic plate of the lumbar support to the side of plastic plate 20 are, for example, somewhat wider, so that a flatter contact and a higher force transmission to beams 12B of backrest 10 are possible for the user.

Figure 3B:
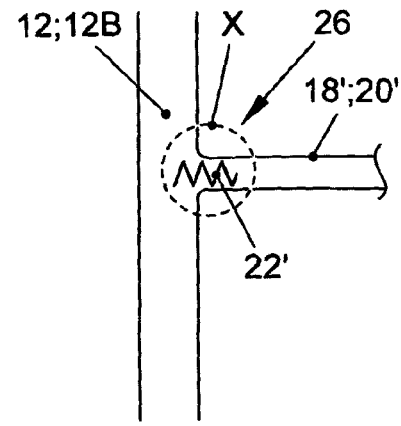
FIG. 3B shows the plastic bar, which is disposed as an elastically resilient element between the beams of the frame-shaped base structure, with a wire as an insert partially integrated in the plastic bar.

In a second embodiment of the first embodiment variant, the connection to beams 12B is supported by a wire-shaped, partially disposed insert 22'. FIG. 2 shows, for example, three parallel horizontally arranged plastic bars 18', which are disposed as elastically resilient components between beams 12B of frame-shaped base structure 12, whereby a partially disposed insert 22', which is used as a resilient element and is formed as a resilient element, is disposed in transition region 26 between beams 12B of frame 12, as FIG. 3B shows. This partially disposed insert 22' is injected, as it were coated with plastic, during the production of backrest 10.

This second embodiment has the advantage that specifically in transition region 26 between beams 12B and plastic bar 18', provided with an insert 22', higher forces can be absorbed and transmitted and the thus achievable elasticity of the coated plastic bar 18' in this area leads overall to an increase in the suspension comfort.

This second embodiment of the first embodiment variant, in a second embodiment of the second embodiment variant, can be realized analogously in transition areas 26 of a plastic plate 20' to beams 12B. As a result, plastic plate 20' by means of partial inserts 22' also receives a more flexible and reinforced connection to beams 12B, as a result of which by means of the lumbar adjusting unit greater adjustment paths can be realized, because overall higher forces can be absorbed.

In a third embodiment, which can be used for both embodiment variants, the connection to beams 12B of frame 12 and the rigidity are supported by a wire-shaped insert 22" running completely between beams 12B. The cross sections of these preferably wire-shaped inserts 22" can be selected in an advantageous manner as smaller compared with the cross sections according to the prior art. The associated plastic coating likewise absorbs part of the acting forces.

For example, a metallic wire, as an elastically resilient element is disposed completely between beams 12B of frame-shaped base structure 12, so that a complete insert 22", made as a coated plastic bar 18", is formed not only (FIG. 3B) in the transition region 26 between beams 12B of frame 12.

Figure 3C:
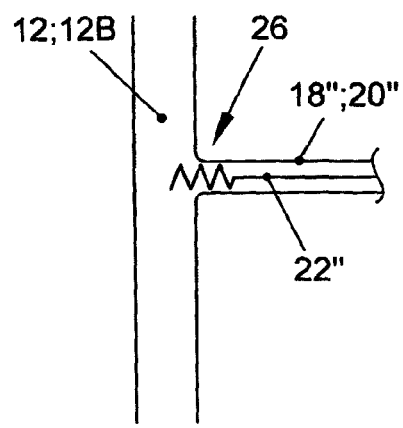
FIG. 3C shows the plastic bar, which is disposed as an elastically resilient element between the beams of the frame-shaped base structure, with a wire as an insert completely integrated in the plastic bar.

Such a coated plastic bar 18" with a complete insert 22" in the third embodiment of both embodiment variants, as FIG. 3C shows, in transition region 26 is made as a resilient element, which toward the middle of backrest 10, as an integral insert 22 changes into a straight, simple wire. This insert 22" disposed over the entire width between beams 12B, like the partial insert as well, is completely injected during the production of backrest 10.

The third embodiment has the advantage that higher forces can be absorbed not only in transition region 26 between beams 12B and plastic bar 18" provided with an insert 22", but also in the back area and/or in the lumbar area of a backrest 10, whereby the cross sections of wire inserts 22" can be very small, particularly smaller than the cross sections known from the prior art. The result is a saving of weight with the same or even better rigidity properties.

In an advantageous manner, a plastic plate 20', 20" with inserts 22', 22" is given a more flexible and reinforced connection to beams 12B and a reinforced structure, as a result of which in the second embodiment variant by means of the lumbar adjusting unit still greater adjustment paths can be realized by the third embodiment 20" compared with the second embodiment 20', because overall still higher forces can be absorbed in inserts 22" of plastic plate 20", said inserts being used as lumbar support and not partially but completely disposed between beams 12B.

Figure 3D:
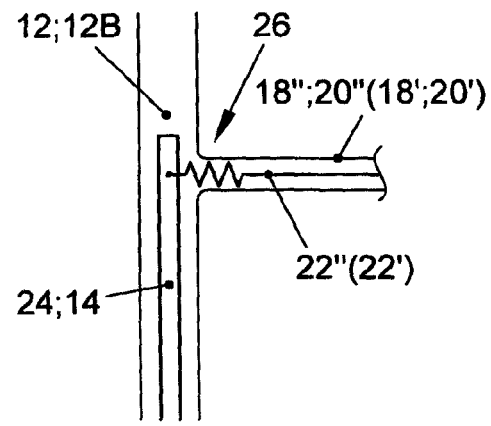
FIG. 3D shows a plastic bar, which is disposed as an elastically resilient element between the beams of the frame-shaped base structure, with a wire which is integrated as an insert completely in the plastic bar and is attached to the stiffening elements in the beams of the backrest according to FIG. 1.

In a preferred embodiment, which likewise can be used for the second and third embodiment of both embodiment variants and is shown in FIG. 3D by way of example for the third embodiment of both embodiment variants, insert 24, reinforcing frame-shaped base structure 12 and used as reinforcing element 14 in frame 12, is connected to plastic-coated bar 18" (18') with the complete insert 22" (22') or to plastic-coated plate 20" (20') with the complete insert 22" (22').

By this embodiment, an inner interconnection is created between frame-shaped base structure 12 and functional elements 18", 20" of the second and third embodiment of the particular embodiment variant via inserts 22' (second embodiment) or 22" (third embodiment) and insert 24, as a result of which the forces exerted on functional elements 18', 20' (second embodiment) or 18", 20" (third embodiment) can be introduced into frame-shaped base structure 12 of backrest 10 via inserts 22', 22", and 24 and absorbed there.

It is pointed out in conclusion that not only wires made of metal or light metal can be used as wire- or plate-like inserts 22', 22", 24 but glass/carbon fibers as well can be injected. In so doing, a combination of the employed materials is also conceivable. The selection also depends on the raw material costs of the employed materials, or materials with higher strength properties are used at positions within backrest 10 where higher forces or force peaks arise.

It is proposed, moreover, that where higher forces or force peaks arise, the cross sections of the particularly employed materials are accordingly increased or a plurality of inserts 22', 22", 24 of same or different cross section are injected.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A backrest comprising:
   a frame-shaped base structure formed from beams, the frame-shaped base structure being made of a fiber reinforced plastic;
   a functional element arranged between the beams of the frame-shaped base structure;
   a metal insert arranged in the frame-shaped base structure; and
   a backrest tilt adjuster,
   wherein the metal insert is directly connected to the backrest tilt adjuster, and
   wherein the functional element is formed either from plastic or as a plastic-coated insert.

2. The backrest according to claim 1, wherein the functional element is formed from a fiber-reinforced plastic.

3. The backrest according to claim 1, wherein the functional element is a plastic bar that is configured as a resilient element in an area formed between the beams of the base structure.

4. The backrest according to claim 3, further comprising a second functional element, arranged between the beams, comprising a plastic-coated insert arranged partially or completely between the beams of the base structure as a wire or plate insert, which as a plastic-coated bar serves as a resilient element in the area formed between the beams of the base structure.

5. The backrest according to claim 4, further comprising a third functional element, arranged between the beams, comprising a plastic element with a predeterminable form, which is configured as a lumbar support in the area formed between the beams of the base structure.

6. The backrest according to claim 5, wherein the predeterminable form is a plastic plate.

7. The backrest according to claim 5, further comprising a fourth functional element, arranged between the beams, comprising a coated insert arranged partially or completely between the beams of the base structure in a predeterminable form, which as a plastic-coated element, is configured as a lumbar support in the area formed between the beams of the base structure.

8. The backrest according to claim 7, wherein the predeterminable form is a plate or a plastic plate.

9. The backrest according to claim 4, wherein the wire or plate insert is made of a metal or glass.

10. The backrest according to claim 1, wherein the functional element is connectable to the insert.

11. The backrest according to claim 1, wherein the metal insert is disposed in each of the beams.

12. The backrest according to claim 11, wherein the metal insert is connected to the functional element.

13. The backrest according to claim 1, wherein the functional element comprises a plate-shaped member.

14. The backrest according to claim 13, wherein the plate-shaped member comprises at least one opening disposed within the plate-shaped member.

15. The backrest according to claim 1, wherein the frame-shaped base is U-shaped,
   wherein the beams comprise:
      a pair of parallel beams; and
      a cross-member disposed between and integrally connected to the pair of parallel beams, and
   wherein the functional element extends across a space between the pair of parallel beams and the cross-member, the functional element having a first end connected to a first of the pair of parallel beams and a second end connected to a second of the pair of parallel beams.

16. The backrest according to claim 15, further comprising a resilient wire disposed within the functional element at the first end and the second end of the functional element.

17. A backrest, comprising:
   a fiber-reinforced plastic frame, comprising:
      a pair of parallel beams;
      a cross-member disposed between and connected to the pair of parallel beams;
      at least one functional element arranged between the beams, the at least one functional element made from a material comprising plastic; and
      a metal insert arranged in the pair of parallel beams; and
   a backrest tilt adjuster,
   wherein the metal insert directly is connected to the backrest tilt adjuster, and
   wherein the at least one functional element extends across a space between the pair of parallel beams and the cross-member, the at least one functional element having a first end connected to a first of the pair of parallel beams and a second end connected to a second of the pair of parallel beams.

18. The backrest according to claim 1, wherein the functional element is a plastic-coated insert arranged partially or completely between the beams of the base structure as a wire or plate insert, which as a plastic-coated bar serves as a resilient element in the area formed between the beams of the base structure.

19. The backrest according to claim 1, wherein the functional element is a plastic element with a predeterminable form, which is configured as a lumbar support in the area formed between the beams of the base structure.

20. The backrest according to claim 1, wherein the functional element is a coated insert arranged partially or completely between the beams of the base structure in a predeterminable form, which as a plastic-coated element, is configured as a lumbar support in the area formed between the beams of the base structure.

21. The backrest according to claim 1, wherein the functional element is integrally formed with the fame-shaped base structure.

22. The backrest according to clam 21, further comprising an insert extending continuously through the functional element into the frame-shaped base structure.

* * * * *